United States Patent [19]

Phillips et al.

[11] 3,729,086
[45] Apr. 24, 1973

[54] CONVEYOR

[75] Inventors: Maurice Norman Phillips, Burton, Wirral; Samuel Roberts, Begington, Wirral, both of England

[73] Assignee: Phillips & Roberts Limited, Cheshire, England

[22] Filed: Mar. 18, 1971

[21] Appl. No.: 125,628

[52] U.S. Cl. ..................................198/34, 198/219
[51] Int. Cl. ........................B65g 25/04, B65g 47/29
[58] Field of Search........................198/34, 218, 219

[56] References Cited

UNITED STATES PATENTS

| 2,144,281 | 1/1939 | Wuest | 198/218 X |
| 3,497,052 | 2/1970 | Willsey | 198/218 X |
| 1,819,032 | 8/1931 | Lehman | 198/34 X |
| 2,858,122 | 10/1958 | MacGregor | 198/218 X |
| 3,263,794 | 8/1966 | Burton | 198/34 |

FOREIGN PATENTS OR APPLICATIONS

| 28,478 | 2/1929 | Netherlands | 198/218 |
| 486,436 | 12/1936 | Great Britain | 198/218 |
| 1,187,543 | 2/1965 | Germany | 198/218 |

Primary Examiner—Evon C. Blunk
Assistant Examiner—W. Scott Carson
Attorney—John J. McGlew et al.

[57] ABSTRACT

A conveyor for conveying workpieces comprising a rectilinear housing having a longitudinal axis, a rear or loading end and a front or unloading end, a plurality of equidistantly spaced apart forwarding members each mounted pivotally in the housing, each forwarding member having a rearward facing stop surface and a forwardly inclined transportation surface extending substantially parallel to the longitudinal axis along which workpieces are conveyed, the pivotal mounting of said forwarding members being effected such that the transportation surface is upwardly inclined in the direction of travel of workpieces in the stable position of the forwarding members and means for moving each forwarding member such that the transportation surface is transferred from the upwardly inclined position to a downwardly inclined position when workpieces are located thereon.

8 Claims, 7 Drawing Figures

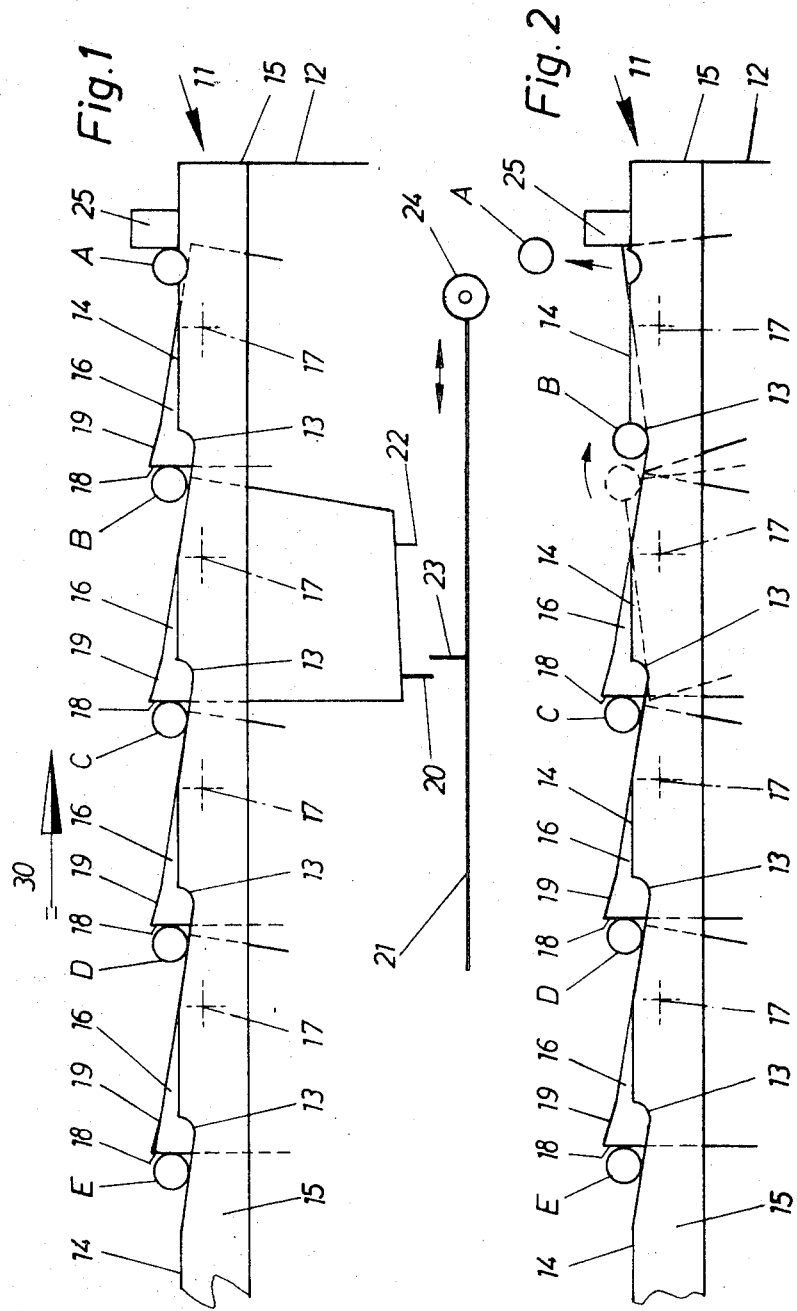

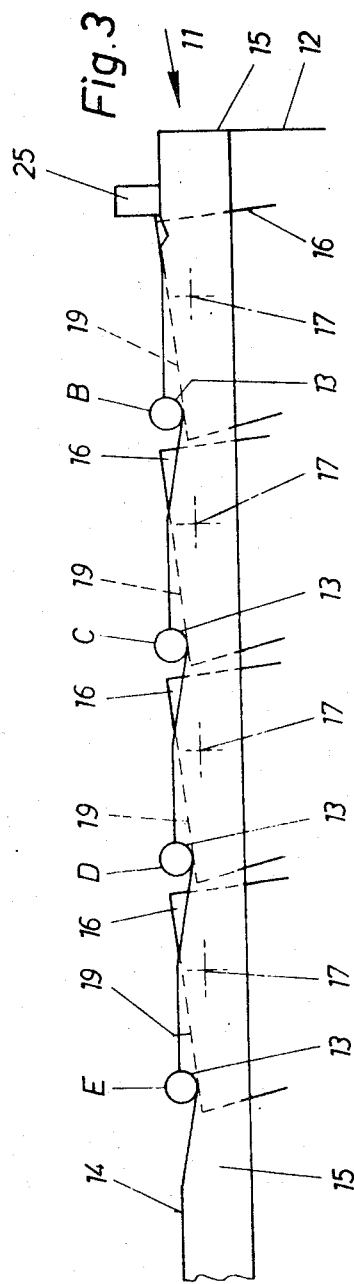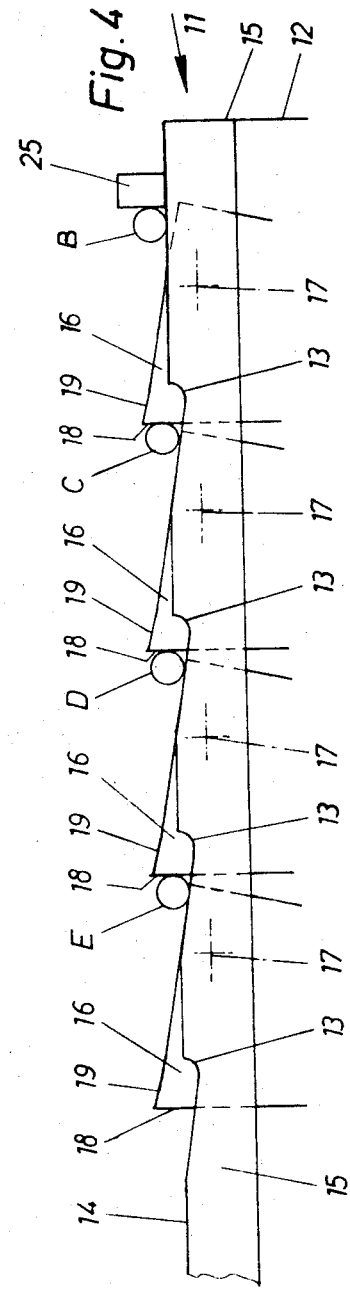

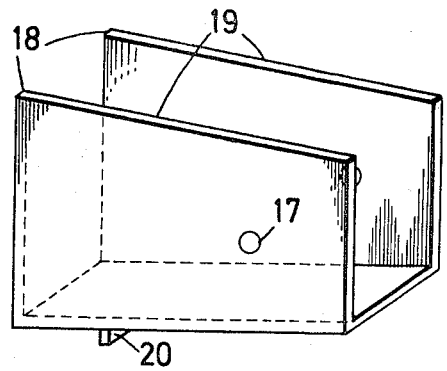
—FIG.6.—
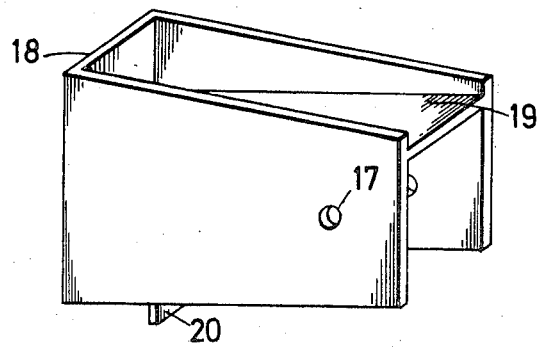
—FIG.7.—

3,729,086

CONVEYOR

BACKGROUND AND SUMMARY OF THE INVENTION

The present invention relates to a conveyor for components utilized in the construction of motor vehicles. More particularly, the invention relates to a conveyor which may be used for the transportation of half-shafts and other irregularly shaped workpieces.

Various types of conveyors have been used in the motor vehicle industry for many years. However, these conveyors have proved unsatisfactory in several ways. Firstly, known conveyors are not capable of maintaining the workpieces being conveyed at regular spaced apart intervals during transportation. Secondly, if one part of a known conveyor ceases to function correctly, no means are provided for preventing the workpieces on the conveyor from piling up. In such a case, the workpieces will physically contact one another with possible consequential damage thereto. Finally, known conveyors have the disadvantage that no means are provided for ensuring that the workpieces are removed from the conveyor at a rate convenient to either an operative or to mechanical take-off means if such latter are employed. This is important inasmuch as physical contact between the workpieces may occur if the take off rate is too slow due to a build-up.

It is an object of the present invention to provide a conveyor which substantially overcomes the above disadvantages by providing a conveyor which maintains the components spaced apart at regular spaced intervals. A further object of the present invention is to incorporate a so-called "fail-safe" device into the conveyor whereby it is brought to rest if any part thereof ceases to function. Finally, it is a still further object of the present invention to provide a conveyor having a take-off speed determined purely by the work-rate of the operative or mechanical take-off means.

According to the present invention a conveyor for conveying workpieces comprises a rectilinear housing having a longitudinal axis, a rear or loading end and a front or unloading end, a plurality of equidistantly spaced apart forwarding members each mounted pivotally in the housing, each forwarding member having a rearward facing stop surface and a forwardly inclined transportation surface extending substantially parallel to such longitudinal axis along which workpieces are conveyed, the pivotal mounting of the forwarding members being effected such that the transportation surface is upwardly inclined in the direction of travel of the workpieces in the stable position of the forwarding members and means for moving each forwarding member such that the transportation surface is transferred from the upwardly inclined position to a downwardly inclined position when workpieces are located thereon.

Preferably, each forwarding member is a substantially U-shaped channel section, the rear faces of each of the side portions of the U forming the rearward facing stop surface and the upper edges of each of side portions of the U forming the transportation surface.

Advantageously, each forwarding member is additionally provided with a lug, said means for moving each and the forwarding member is a pusher bar driven by a prime mover and which engages each lug.

Additionally, the housing includes two side walls, with the upper edge of each side wall defining a plurality of equidistantly spaced apart recesses equal in number to the number of forwarding members.

BRIEF DESCRIPTION OF THE DRAWING

This invention will now be described further, by way of example with reference to the accompanying drawings in which:

FIGS. 1 to 4 are diagrammatic side views of a conveyor showing four sequential stages in its operation;

FIGS. 6 and 7 show, in perspective view, two different embodiments of a forwarding member.

Figure 5:
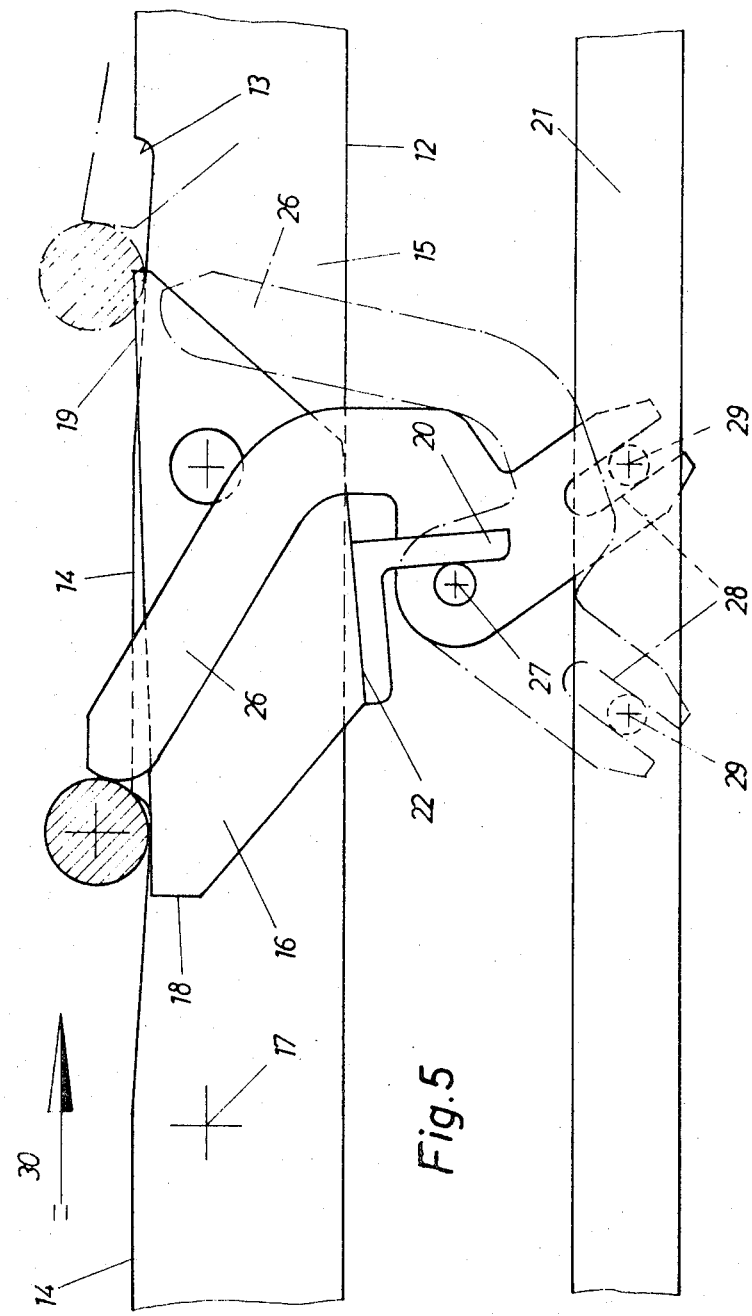
FIG. 5 is a side view of a control lever of the conveyor.

A conveyor 11 has an elongated rectilinear housing 12. Equidistantly spaced apart recesses 13 are provided in the top edges 14 of side walls 15 of the housing 12. A plurality of equidistantly spaced apart sequentially operating forwarding members 16 are each pivotally mounted at 17 in the housing 12. The forwarding members 16 are each a substantially U-shaped channel section. The rear faces of each of the side portions of the U form rearwardly facing stop edges or surfaces 18 and the upper edges of each of the side portions of the U form transportation edges or surfaces 19 arranged substantially in the direction of the longitudinal axis of the housing. The pivot point 17 of each forwarding member 16 is eccentric to the transverse plane of the center of gravity of the member itself. A lug 20 is provided at the bottom of each forwarding member 16.

A pusher bar 21 is located along the longitudinal axis of the housing 12 beneath the underside 22 of the forwarding members. The pusher bar 21 is provided with a plurality of projection 23; the number of projections being equal to the number of forwarding members. A prime mover, for example, an electric motor 24, is used to drive the pusher bar. Safety stop members 25 are provided at the forward end of the conveyor.

FIG. 5 shows a control lever of the conveyor which can be used in certain circumstances, more particularly when the conveyor is forwarding workpieces which tend to skew round. This can occur if the end diameters of the workpiece are not identical. Control levers 26 are pivotally mounted at 27 on the side walls 15 of the conveyor. One end of each control lever 26 is provided with a U-shaped recess 28. Pins 29 fixedly mounted on the pusher bar 21 engage in the recesses 28 of each lever. In use, the conveyor operates in the following manner:

Workpieces A, B, C, D and E, as shown in FIG. 1 are loaded onto the conveyor 11. The direction of transportation of the workpieces is shown by the arrow 30. Component A is retained in the recess 13 provided in the side wall 15 of the housing 12 and is prevented from further forward motion by safety stop members 25. The remaining components B, C, D and E rest on the two inclined parallel surfaces 19 of four equidistantly spaced apart sequentially operating forwarding members 16, and are prevented from further forward motion by the rearwardly pointing stop surfaces 18 of the adjacent forwarding member. The surfaces 19 will be downwardly inclined in a forward direction due to the weight of the workpiece resting on the forward end thereof, so that each forwarding member occupies a first position.

Workpiece A is now removed from the conveyor as shown in FIG. 2. The associated forwarding member 16, released from the weight of the workpiece, reverts to its stable or second position which, due to its eccentric mounting, is downwardly inclined in a rearward direction. The stop surfaces 18 of this forwarding member no longer form a bar to the progress of workpiece B. This workpiece therefore rolls forward on the surfaces until it engages in its corresponding recess 13 provided in the side wall 15 of the housing 12. This occurs sequentially with workpieces C, D, E and their forwarding members and so on. The workpieces B, C, D and E therefore assume the positions shown in FIG. 3.

The pusher bar 21 has a reciprocating movement over a limited travel along the longitudinal axis of the conveyor. When the forwarding members 16 are in their stable position, projections 23 provided on the pusher bar 21 strike against lugs 20 provided at the bottom of the operating edges 18 of each forwarding member.

As can be seen from any of FIGS. 1 to 4, each recess 13 in the side wall of the housing is forward of the most forward part of the corresponding surfaces 19. In consequence, when the pusher bar 21 strikes the lug 20, the rear end of each forwarding member 16 is raised and the workpiece B is raised from its recess 13, rolls down surfaces 19 and assumes the position occupied by workpiece A in FIG. 1. Similarly, workpiece C occupies the position originally occupied by workpiece B and so on. The above cycle can then be repeated.

It should be pointed out that workpiece A need not be removed first for the cycle to be started. For example, it might be that, during operation of the conveyor, workpiece C is noticed to be defective. This can immediately be removed and workpiece D will take its place even though workpiece A has not been removed.

It will also be readily apparent that until an operative or a mechanical take-off means removes the end component, the conveyor will only operate to fill any spaces left. In consequence, if the end workpiece is not removed, a sudden pile-up of workpieces, with physical damage thereto, will not take place.

The mode of operation of the control lever 26 shown in FIG. 5 will now be described. When a workpiece is located in a recess 13, the end of the control lever remote from the end provided with a U-shaped recess abuts the leading edge of the workpiece. As the forwarding members 16 rise under the influence of the pusher bar 21, the levers 26 pivot about their pivot points 27 and remain in abutment with the leading edge of the workpiece. However, by the time that the component reaches the point where the next recess begins, the control lever will be clear of the workpiece and will return to its original position with the next stroke of the pusher bar 21. Any tendency for the workpiece to skew will thus be obviated.

FIG. 6 shows a first embodiment of a forwarding member which may be used for conveying comparatively large workpieces. When the forwarding member is downwardly inclined from back to front (from left to right as seen in FIG. 6), a workpiece is carried along transportation surfaces 19 and is prevented from further forward movement by stop edges or surfaces 18 of the adjacent forwarding member.

In the embodiment shown in FIG. 7, there is provided a forwarding member which may be used for carrying smaller workpieces. When the forwarding member is downwardly inclined from back to front (from left to right as shown in FIG. 7), the workpiece will be carried along transportation surface 19 and is prevented from further forward movement by stop surface 18 of the adjacent forwarding member. When the adjacent forwarding member returns into its stable position, the workpiece will slide into the rear portion thereof.

We claim:

1. A conveyor, for conveying workpieces, comprising, in combination, a relatively elongated substantially rectilinear housing having laterally spaced, substantially parallel, upright side walls, a longitudinal axis, a rear loading end and a front unloading end; a plurality of forwarding members pivotally mounted in said housing for oscillation about respective pivot axes spaced substantially equidistantly longitudinally of said housing and substantially co-planar with each other, said pivot axes extending transversely of said housing; each forwarding member having a rearwardly facing stop surface and an upwardly facing relatively elongated transportaion surface extending forwardly from said stop surface substantially parallel to said longitudinal axis and along which workpieces are conveyed; the pivot axis of each forwarding member being located forwardly of the center of gravity thereof so that each forwarding member has a gravity-influenced stable position in which its transportation surface is inclined upwardly in the direction of travel of the workpieces and the stop surface is retracted out of the path of travel of the workpieces; the forward end of the transportation surface of each forwarding member being closely adjacent the stop surface of the succeeding forwarding member; each forwarding member, responsive to the presence of a workpiece on its transportation surface forwardly of its pivot axis, being pivoted to a second position in which its transportation surface is inclined downwardly in the direction of travel of the workpieces and its stop surface is projected into the path of travel of the workpieces, for travel of the workpiece thereon into engagement with the stop surface of the succeeding forwarding member in the second position of the latter; and means operable to pivot all said forwarding members simultaneously into their second positions for travel of respective workpieces along the transportation surface of each forwarding member into engagement with the stop surface of the respective next succeeding forwarding member.

2. A conveyor as defined in claim 1 wherein each forwarding member comprises a pair of laterally space side walls interconnected for conjoint pivoting about the respective axis; the rear faces of each side wall forming said rearwardly facing stop surface and the upper edges of each side wall forming said transportation surface.

3. A conveyor as defined in claim 1 wherein each forwarding member is additionally provided with a respective lug; said means for moving all said forwarding members simultaneously to their second positions including a pusher bar driven by a prime mover, and which engages all of said lugs.

4. A conveyor as defined in claim 1 wherein, when each forwarding member is in its second position the workpiece thereon is engaged with forwardly inclined upper edge portions of said housing side walls.

5. A conveyor as defined in claim 4, wherein each forwardly inclined upper edge portion of a side wall terminates at an upwardly extending rearwardly facing shoulder spaced from the forward portion of the transportation surface of the associated forwarding member by a distance greater than the width of a workpiece whereby, as a workpiece leaves the forward end of the transportation surface of the next succeeding forwarding member so that the next succeeding forwarding member pivots by gravity into a stable position, the workpiece then engaged with the inclined upper edge portions of said housing side walls will roll therealong into engagement with said shoulders to a position above the rearward end of the transportation surface of the next succeeding forwarding member for lifting thereby when said forwarding members are pivoted simultaneously into their second positions for travel along the transportation surface of said next succeeding forwarding member into engagement with the next succeeding stop surface.

6. A conveyor as defined in claim 5, in which each of said shoulders is arcuately concave in a direction toward the rear loading end of said conveyor.

7. A conveyor as defined in claim 1, including a plurality of pairs of laterally spaced conjointly operable control levers each operatively associated with a respective forwarding member; each pair of levers being mounted for pivoting about an axis disposed beneath the pivot axis of the associated forwarding member; each pair of control levers abutting a workpiece on the transportation surface of the associated forwarding member throughput a substantial portion of the travel of the workpiece along the transportation surface of the associated forwarding member and then pivoting out of the path of the workpiece for travel of the workpiece into abutment with the stop surface of the next succeeding forwarding member; said means operable to pivot all said forwarding members simultaneously into their second positions also swinging said pairs of control levers simultaneously toward their retracted positions.

8. A conveyor as defined in claim 7 in which each forwarding member is additionally provided with a respective lug; said means for moving all said forwarding members simultaneously to their second positions comprising a pusher bar driven by a prime mover and which engages all of said lugs; said pusher bar being operatively connected with all of said control levers.

* * * * *